Aug. 21, 1956 S. JACOBSON 2,759,511
APPARATUS FOR HULLING GRAIN
Filed Feb. 2, 1953 3 Sheets-Sheet 1

INVENTOR.
Sven Jacobson
BY
Pierce, Scheffler & Parker
att'ys

Aug. 21, 1956 S. JACOBSON 2,759,511
APPARATUS FOR HULLING GRAIN
Filed Feb. 2, 1953 3 Sheets-Sheet 3
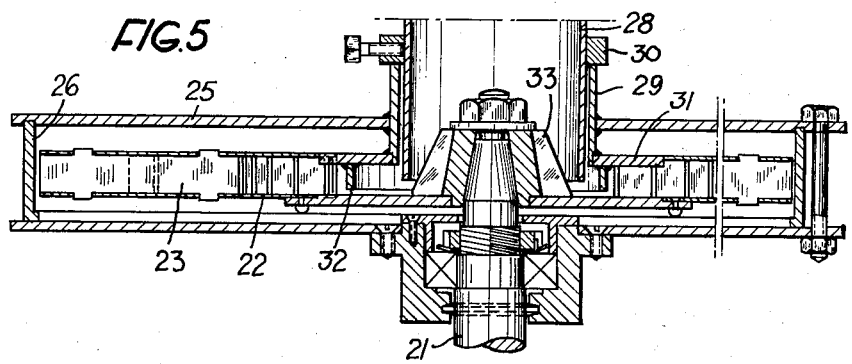
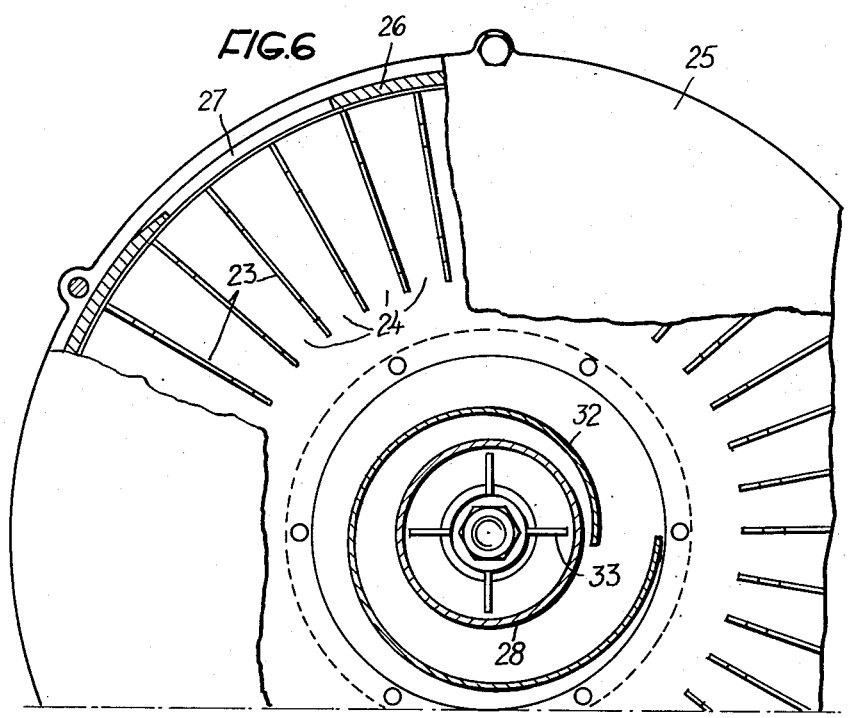
INVENTOR.
Sven Jacobson
BY
Pierce, Scheffler & Parker
attys United States Patent Office 2,759,511
Patented Aug. 21, 1956

2,759,511

APPARATUS FOR HULLING GRAIN

Sven Jacobson, Goteborg, Sweden

Application February 2, 1953, Serial No. 334,543

Claims priority, application Sweden February 7, 1952

10 Claims. (Cl. 146—250)

It is known to shell seeds or grains by subjecting them to the action of a high-velocity current of air or the like, so that the shells are opened up and removed.

The present invention is for an improvement on this method and apparatus for carrying it out, and is characterized in that the seeds, grains or the like (in the following referred to as grains) are injected into a high-velocity air current in a direction which forms an acute angle with the air current. The grains are preferably injected into the air current in the form of a jet of low dispersity.

Further characteristics of the invention will appear from the following description of the method and of the apparatus for carrying the method into effect shown in the accompanying drawings.

Figure 1:
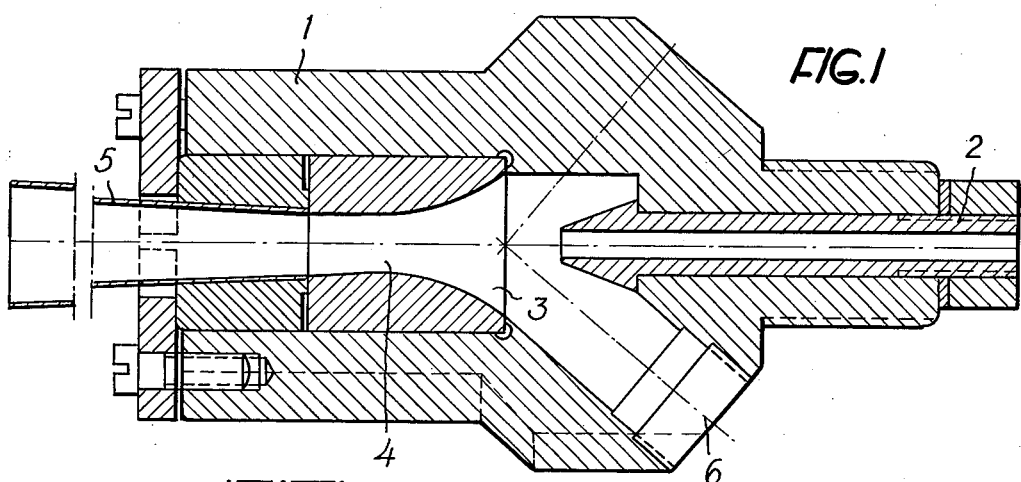
Figure 2:
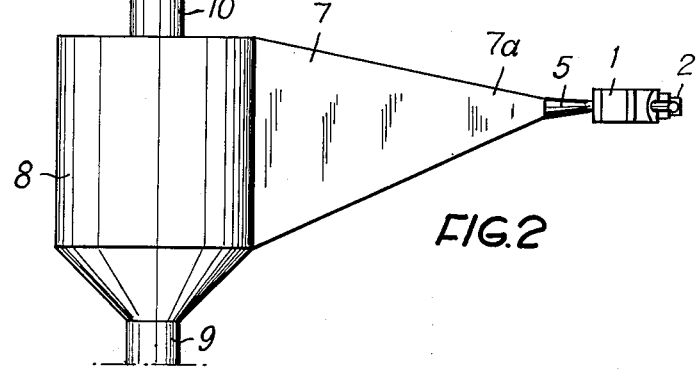
Figure 3:
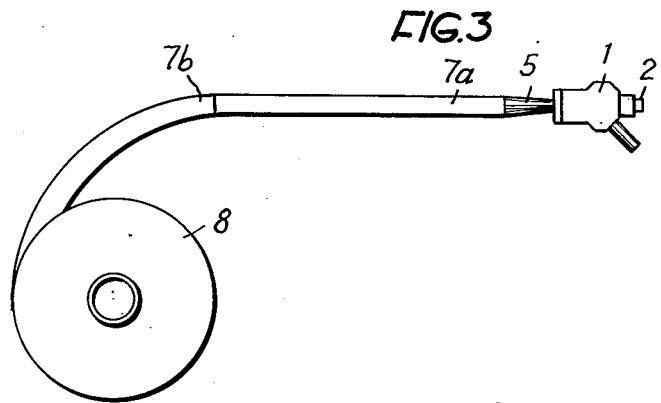
Figure 4:
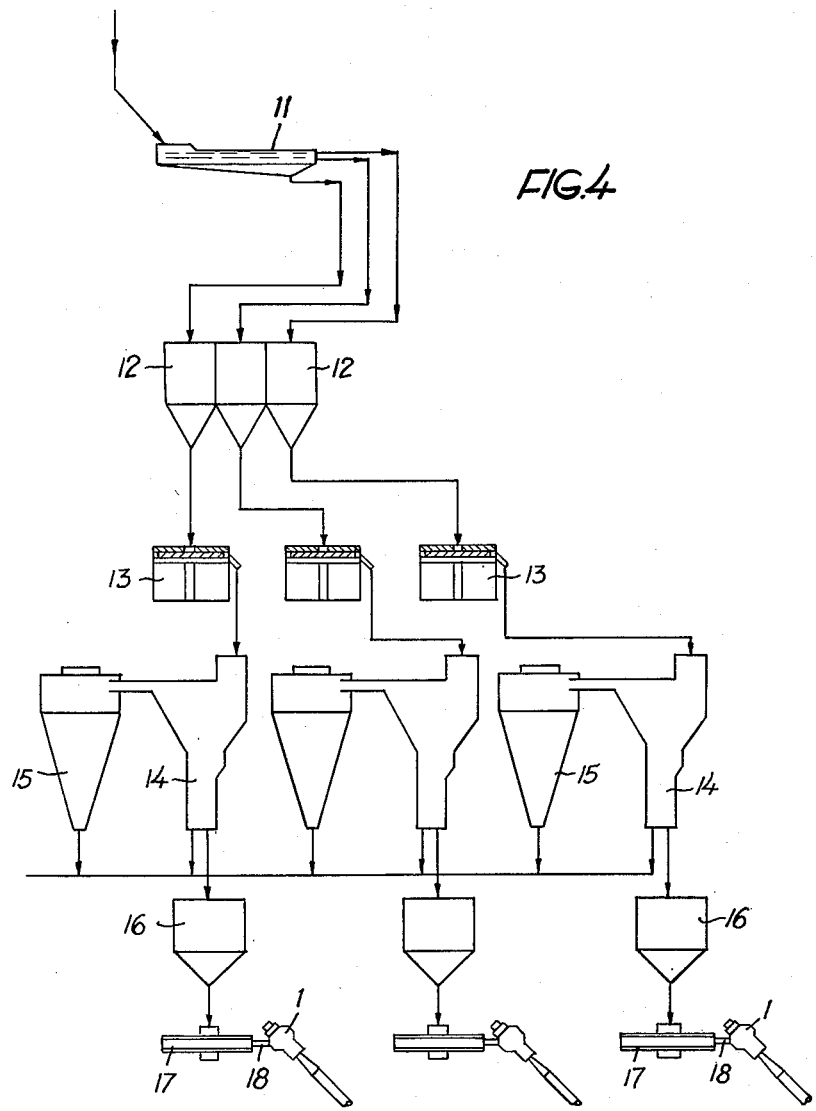

Fig. 1 is an axial sectional view of the shelling device in which the jet of grains is injected into the air current, Fig. 2 is a diagrammatic front elevation of the shelling device and the associated diffusor for separating the grains from the shells or chaff, Fig. 3 is a top plan view of the apparatus shown in Fig. 2, Fig. 4 is a diagrammatic elevation of a plant including means for pretreating the grains prior to the shelling operation, Fig. 5 is a vertical sectional view of a device for feeding the grains to the shelling device, and Fig. 6 is a plan view, with portions broken away and in section to reveal the interior, of the grain feeding device.

In Fig. 1, 1 denotes a housing in which is mounted an expansion nozzle (Laval-nozzle) 2 adapted for connection to an air pressure line; the nozzle opens into a chamber 3 in the housing 1. From a point opposite to the mouth of the nozzle 2 there leads from the chamber 3 an outlet 4 which is shaped so as to form an ejector with the nozzle 2. To the outlet 4 is connected a conically diverging tube 5. The nozzle 2, the outlet 4 and the outlet tube 5 are coaxial.

In the housing 1 there is further an opening 6 to be connected to feed means for the grains to be treated, said means being adapted to supply the grains to the air current in the form of a jet of low dispersity. The opening 6 is so directed that the axis thereof with the axis of the nozzle 2 forms an acute angle.

The device described is assumed to be connected to means for delivering air under a pressure of for example 6 to 7 kilograms per square centimeter at which the Laval nozzle 2 will deliver air at a velocity above the critical velocity of air. Into this high-velocity air current the grains to be shelled, for example oats, are injected, the jet of grains forming an acute angle with the air current, so that the grains are introduced into the air current in a slanting direction from the rear, whereby the air current is not subjected to disrupting disturbances. The velocity of the grains may for example be from 10 to 20 meters per second, and when they are caught by the high-velocity air current they are subjected to acceleration forces of such magnitude that the shells of the grains are torn off. This tearing off of the shells may take place anywhere in the air current and thus may take place in the mixing chamber 3 or in the outlet 4 or in the outlet tube 5, i. e. as long as the velocity of the grains is comparatively small compared with that of the air current.

It has been found preferable, in the interest of economy, to use a nozzle 2 and an outlet 4 having relatively small dimensions. Thus for the shelling of oats, for example, the diameter of the outlet may be limited to 12 millimeters or less. It is then necessary to supply the grains in the form of a jet, as indicated above, so that there is no danger of the outlet becoming stopped up, only one or a few grains passing through the outlet at a time.

The shelling process itself thus takes place while the grains are accelerated by the air current. By and by, however, the difference in velocity between the air current and the grains becomes so small that the shelling action ceases, and it is then necessary to reduce the velocity of the grains and collect them. For this purpose, in the embodiment shown in Figs. 2 and 3, the housing 1 is connected by means of the outlet tube 5 to a diffusor means 7 which has the vertical shape of a flat box the width of which increases in the direction of flow and which at the inlet end is formed with a straight portion 7a parallel with the issuing air current and then with a curved portion 7b which merges into a cyclone-shaped receiver 8. In the straight portion 7a the velocity of the air is considerably reduced so that in this portion such conditions can be made to prevail that the velocity of the grains is retarded by the surrounding air. The outer wall of the curved portion 7b of the diffusor 7 forms a retarding or braking path for the grains which strike the wall at a very acute angle and have their velocity smoothly retarded before they reach the cyclone 8. In the embodiment shown the cyclone 8 has an upwardly directed opening 10 for connection to a vacuum line for the withdrawal of dust and other light particles.

It has been found that the best shelling effect is obtained if the grains are supplied to the opening 6 by means of an arrangement which to a comparatively great extent prevents the access of air, so that the ejector means is not called upon to transport large quantities of air.

In order to improve the shelling effect it has been found desirable before the shelling to subject the grains to a pretreatment for softening or breaking the shell. In Fig. 4 there is shown a plant, in part consisting of known devices, for carrying out such a pretreatment. Thus the grains, for example oats, are supplied to sorting screens 11 on which the grains are sorted into three different sizes, each supplied to its separate receiver 12. From these receivers the grains are passed to a pretreatment, for example on grinding stones 13 on which the shell is broken or cracked. In this process some of the shells may be wholly or completely removed from the grains, and the product from the grinding stones 13 is therefore passed through aspirators 14 with which are associated cyclones 15. The heavier material, i. e. wholly or partly shelled and unshelled grains are passed to receivers 16 from which they, by way of feed means 17 are introduced into shelling devices 1.

As a result of the described pretreatment a better resule is obtained from the shelling operation.

In order to inject the grains through the opening 6 into the shelling device as a fine jet it is possible to use feed means denoted by 17 in Fig. 4, the construction of which is shown in Figs. 5 and 6.

In Fig. 5, 21 denotes a driving shaft coupled for example to an electrical motor (not shown). The shaft at the free end thereof carries a wheel 22 which essentially is made as a fan wheel. Thus the wheel has double walls and between these are mounted blades 23 reaching to the periphery of the wheel but at the inner ends terminating at a considerable distance from the centre. Between the blades 23 there are formed passages 24 (Fig. 6) increasing in the outward direction.

The wheel 22 is enclosed in a stationary housing 25 the cylindrical wall 26 of which closely conforms to the periphery of the wheel 22 but naturally without preventing the rotation of the wheel. As shown in Fig. 6 the wall 26, which thus covers the outlets of the passages 24 has an opening 27.

In the upper wall of the wheel 22 and in the housing 25, and coaxially with the shaft 21, there are provided openings for a cylindrical tube 28 which is slidable in the axial direction in a sleeve 29. The lower end of the tube 28 may be lowered into contact with the lower radial wall of the wheel 22 but in Fig. 5 is shown slightly lifted and held in this position by means of a stop ring 30. The sleeve 29 at the lower end thereof has a radial flange 31 which completely fills out the relatively wide opening in the upper wall of the wheel 22. To the underside of the flange 31 is attached a spirally curved screen 32 reaching down just to the lower wall of the wheel 22.

When the wheel 22 rotates and the tube 28 is filled with grains these will be set in rotation by wings 33 provided on the hub of the wheel 22, and by the centrifugal force acting thereon the grains will pass out below the lower edge of the tube 28, at least the greater part of the grains being caught by the spiral-shaped screen 32. Thus a row of grains will continuously move along the screen 32 and leave the screen at the outer end thereof, wherefrom the grains under the action of the centrifugal force are thrown out into the passages 24 moving past the opening 27. By suitable adjustment of the tube 28 it is possible to so arrange matters that only one grain or only a few grains, for example 3 to 4, at a time are fed into each passage.

The position of the outer end of the spiral-shaped screen 32 is so adjusted in relation to the number of revolutions and diameter of the wheel that the grains reach the periphery of the wheel and are brought to rest against the wall 26 before they reach the opening 27. When the trailing walls of the passages 24 reach the edge of the opening 27 the grains are thrown out essentially in the tangential direction, and the successive grains or groups of grains in this way form a comparatively closed jet of low dispersity which passes through the opening 6 into the shelling device 1. The openings 27 and 6 are connected with each other by means of a tube 18 shown in Fig. 4.

It is not absolutely necessary that the wall 26 closely surrounds substantially the whole of the periphery of the wheel 22. The essential thing is that the grains reach the periphery of the wheel before they are thrown out through the opening 27. If the spiral-shaped screen 32 can be adjusted by rotation it will be possible to arrange for the grains to reach the periphery of the wheel 22 at any point desired, i. e. near the edge of the opening 27, so that unnecessary friction between the grains and the wall 26 is avoided.

When treating grains such as oats, it is important that the grains are not subjected to impact beyond a certain limit. In the arrangement shown the grains are accelerated comparatively continuously up to the same velocity as the wheel 22. If on the other hand grains were to be supplied at a relatively great distance from the centre of the wheel there would be danger of the grains being crushed by the passing blades.

The invention is not limited to the arrangement shown in the drawing and described above but may, as regards the details thereof, be modified within the scope of the appended claims. If it is desired, two or more jets of grains may be supplied to the same shelling device by providing in the housing 1 further holes for the introduction of grains. In Fig. 1 a dash and dot line at the same angle to the axis of the nozzle 2 as the axis of the opening 6 indicates the position and the direction of such a further feed opening. Other modifications are of course possible without having to be specifically described.

What I claim is:

1. Apparatus for shelling grains comprising a wall defining a chamber, a first opening in said wall defining an inlet for pressure air into said chamber, an oppositely disposed second opening in said wall defining an outlet from said chamber, a third opening in said wall defining an inlet for unshelled grains into said chamber, feeding means including throw mechanism positioned to throw grains in the form of a jet through said third opening, said third opening and said feeding means being positioned to introduce said jet of grains into an air current passing between said first opening and said second opening at an acute angle thereto, an outlet tube having a curved brake path positioned to receive the grains discharged through said second opening, and a cyclone-shaped receiver connected to the discharge end of said outlet tube, the wall of said outlet tube merging smoothly with the wall of said receiver.

2. Apparatus as defined in claim 1 in which said outlet tube includes a diffuser.

3. Apparatus for shelling grains comprising a wall defining a chamber, a first opening in said wall defining an inlet for pressure air into said chamber, an oppositely disposed second opening in said wall defining an outlet from said chamber, a third opening in said wall defining an inlet for unshelled grains into said chamber, feeding means including throw mechanism positioned to throw grains in the form of a jet through said third opening, said third opening and said feeding means being positioned to introduce said jet of grains into an air current passing between said first opening and said second opening at an acute angle thereto, said throw mechanism comprising a rotatable wheel having passages leading from the central portion of the wheel towards its periphery, means for supplying grains to said central portion, a stationary screen partially surrounding said wheel and covering the outlets from said passages, one edge of said screen determining the position of the grain jet thrown out from the wheel when rotating, said means for supplying grains being adapted for feeding into each passage only a small number of grains per revolution of the wheel.

4. Apparatus as defined in claim 3 in which said passages are formed by partitions the outer ends of which reach to the periphery of the wheel and the inner ends of which are at some distance from the center of the wheel.

5. Apparatus as defined in claim 3 in which the means for supplying grains to the central portion of said wheel comprises a tube mounted substantially coaxial with the wheel and cooperating with one surface thereof for controlling the amount of grains supplied between the end of said tube and the said surface, said tube being axially movable.

6. Apparatus as defined in claim 5 in which a curved screen surrounds the outlet end of said tube, said curved screen being adapted during the rotation of the wheel to collect grains issuing from said tube into a string moving along the screen and at the end of the screen being transferred to the passages so that only a few grains at the most are supplied to each passage.

7. Apparatus as defined in claim 6 in which the curved screen is rotatably mounted.

8. Apparatus as defined in claim 3 in which the normal speed of the wheel, the length of the passages and the position of the means for supplying grains are such that the grains supplied to the passages are brought into contact with the screen covering the outlets of the passages before they issue from the wheel.

9. Apparatus as defined in claim 3 in which the axis of rotation of the wheel is substantially vertical.

10. Apparatus as defined in claim 3 in which the means for supplying grains to the central portion of the wheel comprises a tube mounted substantially coaxial with the wheel and cooperating with one surface thereof for controlling the amount of grains supplied between the end of said tube and the said surface, said tube being axially movable, and wing means secured to said wheel inside of said tube for facilitating the discharge of grains from said tube.

References Cited in the file of this patent

UNITED STATES PATENTS

| | | |
|---|---|---|
| 579,862 | Danvin et al. | Mar. 30, 1897 |
| 1,423,450 | Otterstedt | July 18, 1922 |
| 1,699,441 | Negro | Jan. 15, 1929 |
| 2,032,827 | Andrews | Mar. 3, 1936 |
| 2,616,466 | Lindner et al. | Nov. 4, 1952 |
| 2,620,841 | Jacobson | Dec. 9, 1952 |